(No Model.)
M. H. MORRIS.
DRIVE WELL POINT.
No. 315,815. Patented Apr. 14, 1885.
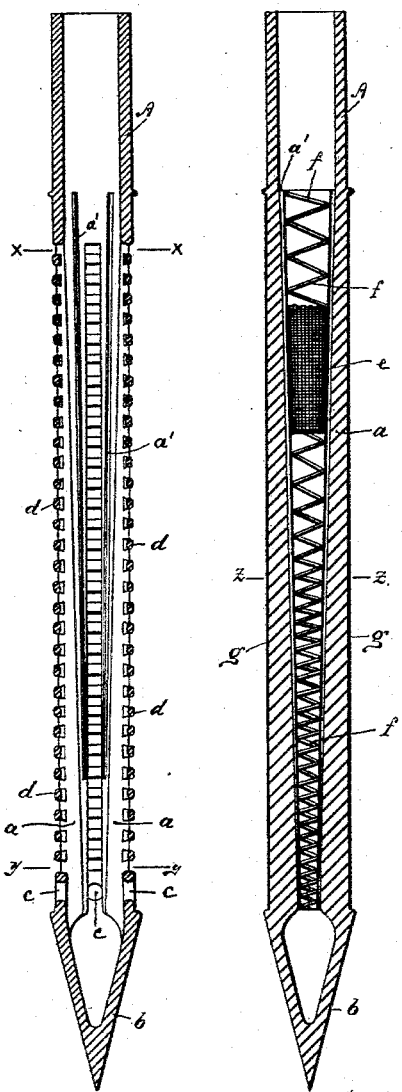
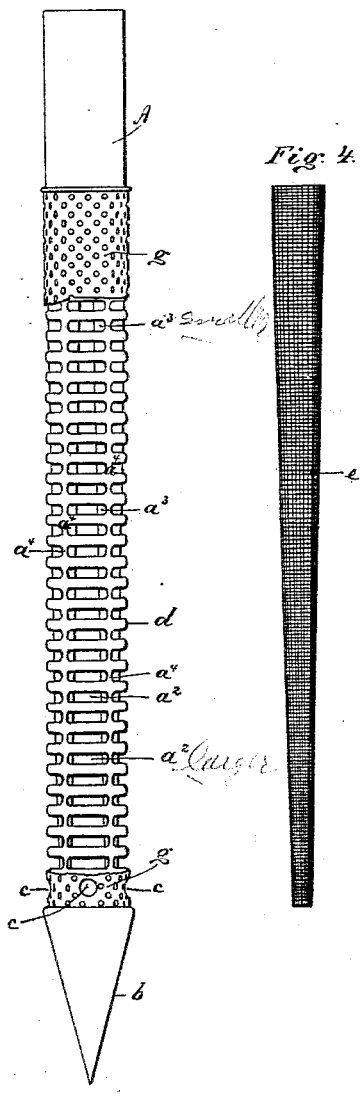
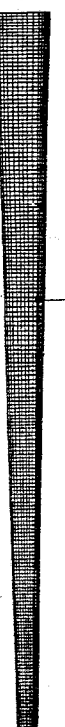
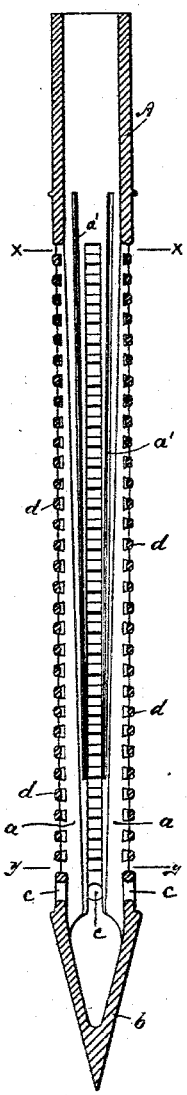
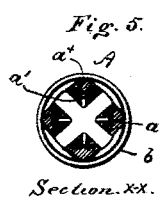
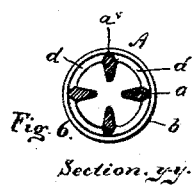
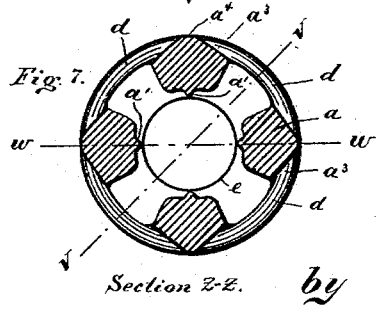
Witnesses:
L. Holmboe
C. C. Linthicum
Inventor
Miles H. Morris
by Fisher Fisher
His Attorneys.

UNITED STATES PATENT OFFICE.

MILES H. MORRIS, OF CHICAGO, ILLINOIS.

DRIVE-WELL POINT.

SPECIFICATION forming part of Letters Patent No. 315,815, dated April 14, 1885.

Application filed December 30, 1884. (No model.)

*To all whom it may concern:*

Be it known that I, MILES H. MORRIS, a citizen of the United States, residing at Chicago, in the county of Cook and State of Illinois, have invented certain new and useful Improvements in Drive-Well Points, of which I do declare the following to be a full, clear, and exact description, reference being had to the accompanying drawings, forming part of this specification.

Drive-well points have heretofore been made in which the point proper consisted of a cast-metal rod having a taper end and a series of longitudinal ribs projecting radially from a solid center or core. A wire-gauze strainer and a perforated sheet-metal screen were arranged as cylindrical jackets, one close within the other and directly about said radial ribs to afford therewith a number of internal tubular-like passages, through which the water would flow to the upper sections of the well. By reason of the central core and ribs much space was occupied, so that for a well-point of given bore the discharge-capacity into the upper tube-sections was much less than if such obstructions did not exist. The close contact of the delicate strainer with the perforated screen not only diminished the free inflow of water, but the exposed position of said parts as jackets is also objectionable. If the screen were cut or torn in driving the point the same obstacle would be apt to work like destruction to the strainer, and thus the point might become clogged and the flow of water be permanently impaired.

My present invention has relation to the improvement of this class of drive-well points wherein an outer screen is employed; and it consists in various novel features of construction hereinafter described, illustrated in the accompanying drawings, and particularly defined in the claims at the end of the specification.

Figure 1 is a view in vertical section on line $vv$ of Fig. 7. Fig. 2 is a view in vertical section on line $ww$ of Fig. 7. Fig. 3 is a view in side elevation, a portion of the water-screen being broken away to illustrate the subjacent parts. Fig. 4 is a detail of the inner conical strainer. Fig. 5 is a view in transverse section on line $xx$ of Fig. 1. Fig. 6 is a view in transverse section on line $yy$ of Fig. 1. Fig. 7 is an enlarged view in transverse section on line $zz$ of Fig. 2.

A designates the tubular drive-well point, the upper portion of which is adapted in the usual manner to connect with the upper sections of the well-tube, and the lower portion of which point is formed with the tapering end $b$, to permit of its being driven into the soil. The main body of the well-point is provided with a series of rows of perforations, $a^2$, preferably of oblong shape, and at each side of these perforations grooves $a^3$ are formed, which vanish at the exterior longitudinal ribs or projections of the segment, $a^4$. Upon and against said ribs $a^4$ rests the outer screen, $g$, of perforated sheet-brass.

Between the perforations $a^2$ extend the circumferential ribs $d$, the outer surfaces of which are preferably rounded and form supports for the screen $g$.

By providing the exterior of the tubular point with ribs or projections a firm bearing is obtained for the outer screen, $g$, and by rounding the edges of these ribs and forming the groove $a^3$, as shown, but very few of the perforations of the screen $g$ will be obstructed, and hence a more copious access of the water through the screen will be obtained.

It will be readily understood that the shape and arrangement of the ribs on the exterior of the tubular point may be varied; but I prefer that they should be arranged as shown, and that these surfaces should be rounded or tapering, for the purpose indicated.

In driving a tubular well it is found that the point is subjected to great strain near its upper portion, and it is for the purpose of giving sufficient strength to this part and at the same time providing ample openings for the ingress of water that I make the rows of perforations large near the base and of decreasing size toward the upper end of the point, as seen in Fig. 3 of the drawings. The segments $a^4$ of the tube, between the rows of perforations, are thus comparatively broad near the top and of decreasing breadth toward the taper end of the point; but in order to avoid any weakening of the point in its lower portion these segments are formed with the inwardly-projecting longitudinal ribs $a$, which are of increasing thickness toward the taper end of the point. It will thus be seen that although the size of the perforations for the admission of water is increased toward the taper end of the point, the strength of such part of the point is nevertheless maintained. The inner surfaces of these longitudinal ribs are preferably provided with the raised bearing-edges $a'$, adapted to sustain the inner strainer, $e$, which is made of wire-gauze or other suitable material, in conical form, and having the wire coil $f$ bearing against the interior of the strainer to preserve its shape.

The object in providing the thin bearing-edges $a'$, whereon the strainer may rest, is to avoid, as far as possible, obstructing the meshes of the strainer, and yet at the same time to secure for it a firm and uniform support throughout its length. The inward inclination of the bearing-edges $a'$ will guard against any downward displacement of the strainer $e$, which will be secured at its top to the tubular walls by soldering or in any other suitable manner. It will be noticed that the thickness of the circumferential ribs $d$ between the perforations is uniform in each series, and hence the channels between the interior longitudinal ribs, $a$, are of increased capacity toward the tapering end of the point—a feature of importance, as all danger of the stoppage of the channels by the accumulation of sand or dirt is thereby avoided. Near the base of the channels, between the interior longitudinal ribs, large perforations $c$ are formed in the walls of the point and in the outer screen, $g$, for the discharge of any sand or like material that may have passed through the perforations of the screen. By arranging the strainer upon the interior of the point and separate from the perforated metal screen it is better protected, so that should the screen become cut or torn in driving the point the strainer will perform its functions unimpaired. Again, the effective surface-exposure of both screen and strainer is increased by the separation, and as well by the manner in which these parts are sustained. Not only is the capacity of the point increased, but at the same time the enlarged space between the strainer and the walls of the tube toward the taper end allows the dirt and sand, which may force through the screen, to fall free and escape through the perforations $c$ at the bottom, so that the well easily clears itself when the pump is at rest.

It will be readily understood by those skilled in the art that the precise details of construction above set out may be varied without departing from the scope of my invention, and that certain novel features thereof may be employed in connection with other existing forms of well-point.

Having thus described my invention, what I claim as new, and desire to secure by Letters Patent, is—

1. A drive-well point comprising a hollow perforated tube having the longitudinal ribs or segments whereon the outer screen may rest and the transverse ribs connecting said longitudinal ribs or segments, substantially as described.

2. A drive-well point consisting of a hollow perforated tube having vanishing grooves at each side of the perforations to form the ribs or projections whereon the screen may rest, substantially as described.

3. A drive-well point consisting of a hollow perforated tube having the longitudinal ribs or segments and the transverse connecting-ribs and the inwardly-projecting longitudinal ribs whereon the inner screen may rest, substantially as described.

4. A drive-well point consisting of a hollow perforated tube having exterior and interior ribs and an outer strainer and an inner screen supported, respectively, upon said ribs, substantially as described.

5. A drive-well point consisting of a hollow perforated tube having inwardly-projecting longitudinal ribs of increasing thickness toward the taper end of the point, substantially as described.

6. A drive-well point consisting of a hollow perforated tube having inwardly-projecting ribs and having channels between said ribs and opposite the projections of increasing size toward the taper end of the point, substantially as described.

7. A drive-well point having inwardly-projecting longitudinal ribs and having enlarged perforations at the base of and between said ribs, substantially as described.

8. A drive-well point consisting of a tube having segments between the series of perforations, said segments decreasing in breadth toward the taper end of the point, substantially as described.

9. A drive-well point consisting of a tube having segments between the rows of perforations, which segments are of decreasing breadth and of increasing thickness toward the taper end, substantially as described.

MILES H. MORRIS.

Witnesses:
JAMES H. PEIRCE,
GEO. P. FISHER, Jr.